United States Patent [19]

DeCoene

[11] 4,093,087
[45] June 6, 1978

[54] UNLOADING TUBE ARRANGEMENT FOR COMBINE HARVESTER GRAIN TANK

[75] Inventor: Frans J. G. C. DeCoene, Zedelgem, Belgium

[73] Assignee: Sperry Rand Corporation, New Holland, Pa.

[21] Appl. No.: 810,546

[22] Filed: Jun. 27, 1977

[30] Foreign Application Priority Data

Jun. 29, 1976 United Kingdom ............... 26947/76

[51] Int. Cl.² ............................................... B60P 1/42
[52] U.S. Cl. ................................... 214/83.26; 198/668; 214/83.32
[58] Field of Search ............... 214/17 D, 83.26, 83.32, 214/520, 521, 522; 56/473.5; 198/666, 668

[56] References Cited

U.S. PATENT DOCUMENTS

| 3,638,812 | 2/1972 | Ryczek | 214/83.26 |
| 3,938,684 | 2/1976 | Quoiffy | 214/521 |

*Primary Examiner*—Robert G. Sheridan
*Attorney, Agent, or Firm*—Frank A. Seemar; John B. Mitchell; Joseph A. Brown

[57] ABSTRACT

A combine harvester comprising a grain tank with a discharge opening at one side of the harvester, an unloading tube having a main portion and an end portion angled with respect to the main portion, the angled portion being pivotally mounted on the grain tank with the unloading tube in communication with the discharge opening, an unloading auger disposed in the main portion of the unloading tube and having a receiving end spaced from the pivotal connection between the tube and the tank, a grain tank auger extending within the grain tank and having a discharge end spaced from the pivotal connection between the tube and the tank, and an intermediate shaft interconnecting the discharge end of the grain tank auger and the receiving end of the unloading auger by means of a pair of universal joints respectively disposed at the ends of the intermediate shaft, the universal joints being disposed at opposite sides of the pivotal connection between the tank and the tube and the intermediate shaft being telescopic.

15 Claims, 6 Drawing Figures

4,093,087

UNLOADING TUBE ARRANGEMENT FOR COMBINE HARVESTER GRAIN TANK

BACKGROUND OF THE INVENTION

1. Field of the Invention

The present invention relates to combine harvesters and is concerned with the design of unloading tubes by which the grain tanks of such harvesters are unloaded.

2. Description of the Prior Art

It is known to provide combine harvesters with pivotally mounted unloading tubes which, for transport purposes, are positioned alongside the harvesters but which, for unloading the grain tanks, can be pivoted to positions generally transverse of the central vertical fore-and-aft planes of the harvesters. In the unloading position, the unloading tube is aligned with a discharge opening in the grain tank and is coupled thereto so as to be able to receive grain from the grain tank without any grain losses occurring. The unloading tube contains an unloading auger, which in the operative unloading position can be coupled to another auger in the grain tank for unloading the grain. With this arrangement unloading is only possible in one position (i.e. the unloading position) of the unloading tube.

So-called "closed" unloading tubes have been proposed to enable the grain tank to be unloaded in a series of positions of the unloading tube and to enable the discharge end of the unloading tube to be moved above a grain receiving trailer, so as to load the trailer more evenly and completely. In these arrangements the unloading tube is normally pivotally mounted on a transition tube which is disposed between the grain tank and the unloading tube and which contains coaxially therein a transition shaft, which is frequently in the form of a transition auger shaft. Complicated drive arrangements, e.g. a plurality of bevel gears, are provided to drive the unloading auger and the grain tank auger. Hence such "closed" unloading tubes are expensive.

Unloading tubes of the known type described above are disclosed in British Patent Specifications Nos. 1,086,037, 1,251,136 and 1,264,732.

Other "closed" unloading tubes (e.g. Germany OS No. 2.412.816, U.S. Pat. No. 3,938,684) have been proposed wherein the drive arrangements are of such a type that operation is only possible in one position or in only a very restricted range of positions. To avoid damage which would occur if the drive line is energized when the unloading tube is not properly positioned in its unloading position, special safety devices have to be provided. These safety devices are complicated and hence expensive.

OBJECT OF THE INVENTION

It is an object of the present invention to provide a combine harvester having an unloading tube of the "closed" type which is simple in design and which may be used to unload grain in a large range of positions without risk of damage to the unloading tube.

SUMMARY OF THE INVENTION

According to the present invention, a combine harvester comprises a grain tank with a discharge opening at one side of the harvester, an unloading tube having a main portion and an end portion angled with respect to the main portion, the angled portion being pivotally mounted on the grain tank with the unloading tube in communication with the discharge opening, an unloading auger disposed in the main portion of the unloading tube and having a receiving end spaced from the pivotal connection between the tube and the tank, a grain tank auger extending within the grain tank and having a discharge end spaced from the pivotal connection between the tube and the tank, and an intermediate shaft interconnecting the discharge end of the grain tank auger and the receiving end of the unloading auger by means of a pair of universal joints respectively disposed at the ends of the intermediate shaft, the universal joints being disposed at opposite sides of the pivotal connection between the tank and the tube, the intermediate shaft being telescopic and the pivot axis between the tube and the grain tank being inclined so as to extend upwardly in a direction towards the central vertical fore-and-aft plane of the combine harvester, the unloading tube being pivotally movable throughout a range of unloading positions in all of which the main portion of the tube extends substantially laterally with respect to the central fore-and-aft plane.

Preferably, the unloading tube is pivotally movable to a transport position in which the main portion of the tube extends substantially parallel to said fore-and-aft plane.

The pivot axis between the grain tank and the unloading tube is preferably inclined so as also to extend forwardly in a direction towards the central fore-and-aft plane of the harvester. The angle of inclination of the pivot axis and the angle between the main and end portions of the tube are preferably such that the main and end portions of the tube lie in a horizontal plane in the transport position and in a vertical plane, perpendicular to said central fore-and-aft plane, in a preferred one of the unloading positions. In the preferred unloading position the main portion of the tube may be inclined by an angle of the order of 20° to the horizontal. The pivot axis is preferably inclined to the horizontal at an angle of 45°, and the discharge opening may be circular and have a diameter twice, or substantially twice, the diameter of the main portion of the tube so as to avoid interference of the intermediate auger shaft with structural components of the grain tank discharge opening and of the angled end portion of the unloading tube in any position thereof, and more especially in the transport position thereof.

When the unloading tube is in its preferred unloading position, the angle between the grain tank auger and the intermediate shaft and between the intermediate shaft and the unloading auger is of the order of 170°. When in the transport position each of these angles is 135°.

Preferably auger flights are secured to one of the telescoping portions of the intermediate shaft. To accommodate the differences in diameter between the main portion of the unloading tube and the discharge opening, the end portion of the unloading tube conveniently tapers with decreasing cross-sectional area towards the main portion of the tube.

BRIEF DESCRIPTION OF THE DRAWINGS

A combine harvester according to the invention will now be described, by way of example, with reference to the accompanying drawings, in which.

DETAILED DESCRIPTION OF A PRIOR ART STRUCTURE

Figure 1:
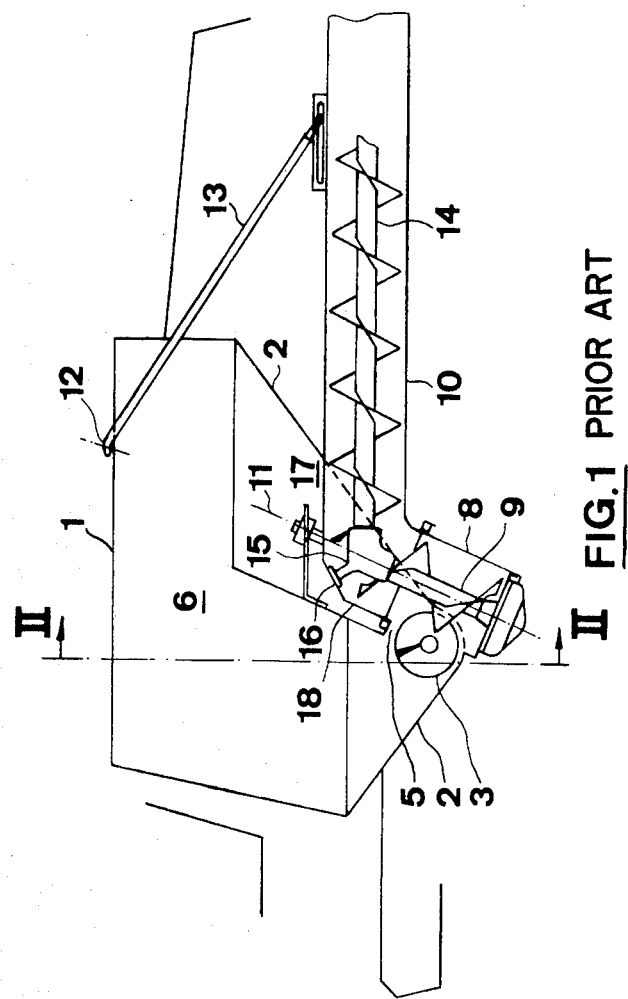
FIG. 1 is a schematic side view of a grain tank and an unloading tube of a known combine harvester the tube being shown in a transport position.
Figure 2:
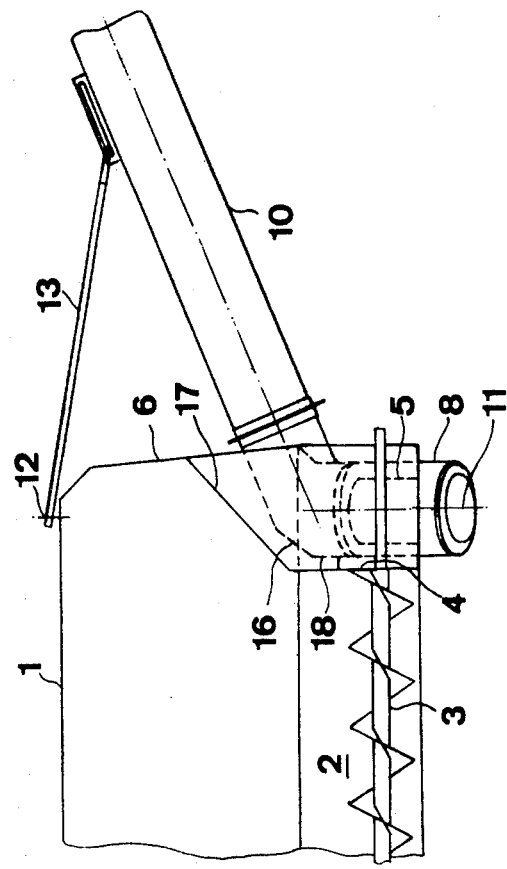
FIG. 2 is a schematic sectional view on the line II—II of FIG. 1, but with the unloading tube in an unloading position.

With reference to FIGS. 1 and 2, the known combine harvester comprises a grain tank 1 having a transversely extending trough-shaped lower section 2 containing a grain tank auger 3. The grain tank auger 3 has a discharge end 4 (FIG. 2) adjacent the grain tank discharge opening 5 which faces generally rearwardly in a recessed section 17 of the grain tank side wall 6. A transition tube 8 is coupled to the grain tank discharge opening 5 and extends upwardly and rearwardly. The tube 8 accommodates an intermediate auger 9. The tube 8 pivotally supports, at its upper end, an unloading tube 10 with an angled receiving end 18. The pivot axis 11 of the tube 10 coincides with the rotational axis of the intermediate auger 9. The unloading tube 10 is further supported by a rod 13 pivotally mounted on the grain tank 1 at a point 12 on the axis 11. The unloading tube 10 includes an unloading auger 14 which is driven from the intermediate auger 9 via a gearbox 15 having bevel gears. The gearbox 15 is mounted within the unloading tube 10 at the angle 16 thereof. The gearbox 15 forms an obstruction to the smooth flow of grain through the unloading tube 10. The drive to the grain tank auger 3 and to the augers 9 and 14 has not been shown.

In operation, the grain tank auger 3 is operative to feed the grain contained in the grain tank 1 to the discharge opening 5 where the grain falls by gravity into the lower end of the transition tube 8. The intermediate auger 9 and the unloading auger 14 convey the grain through the tubes 8 and 10 to the discharge end of the tube 10. It is apparent that the grain is deflected through several sharp angles. This, together with the obstruction of the gearbox 15, impedes the flow of grain, resulting in a reduction in unloading capacity and the possibility of the grain being damaged. Furthermore, the known structure shown in FIGS. 1 and 2 is complicated and expensive.

DETAILED DESCRIPTION OF A PREFERRED EMBODIMENT OF THE INVENTION

Figure 3:
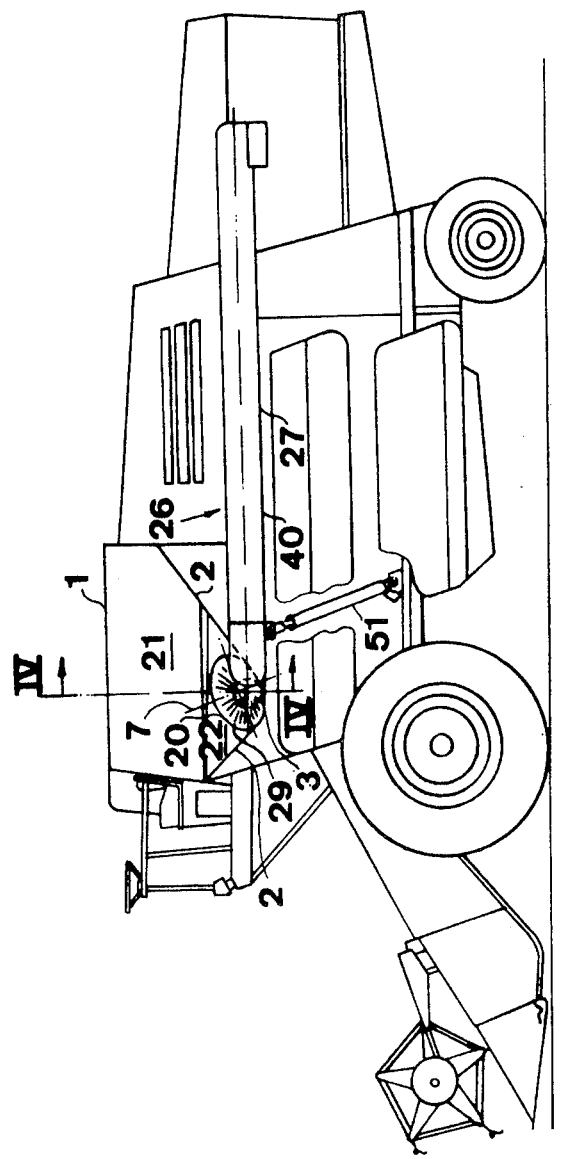
FIG. 3 is a schematic side view of a combine harvester with a grain tank and an unloading tube according to the present invention.
Figure 4:
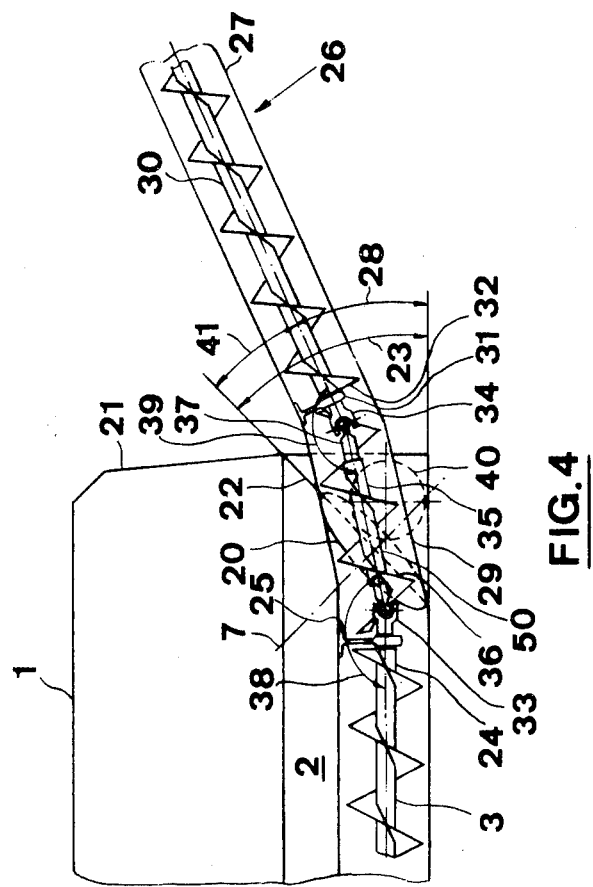
FIG. 4 is a schematic sectional view on the line IV—IV of FIG. 3, but with the unloading tube in a preferred unloading position.
Figure 5:
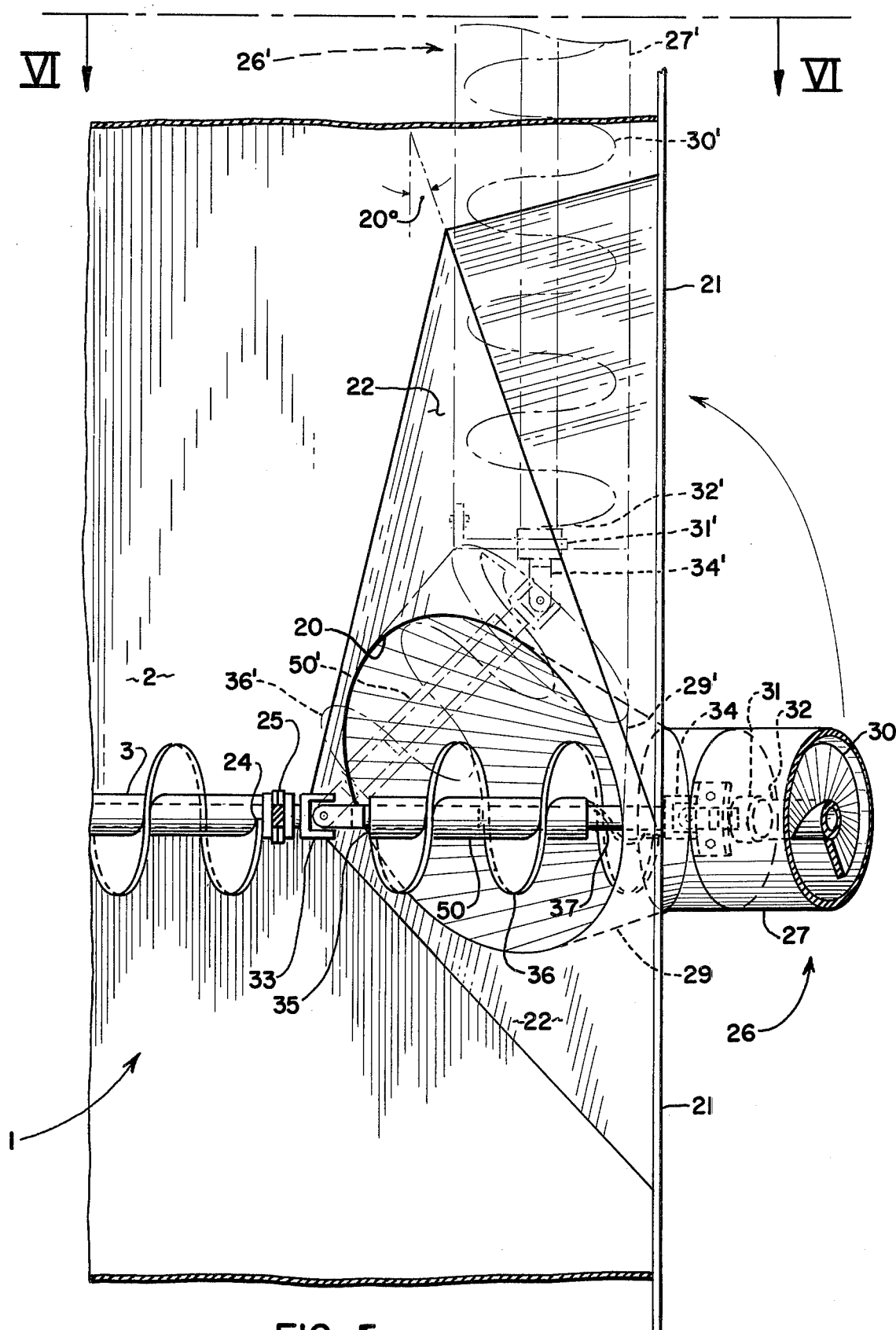
FIG. 5 is a partial plan view of a grain tank having a discharge opening and unloading tube according to the present invention.
Figure 6:
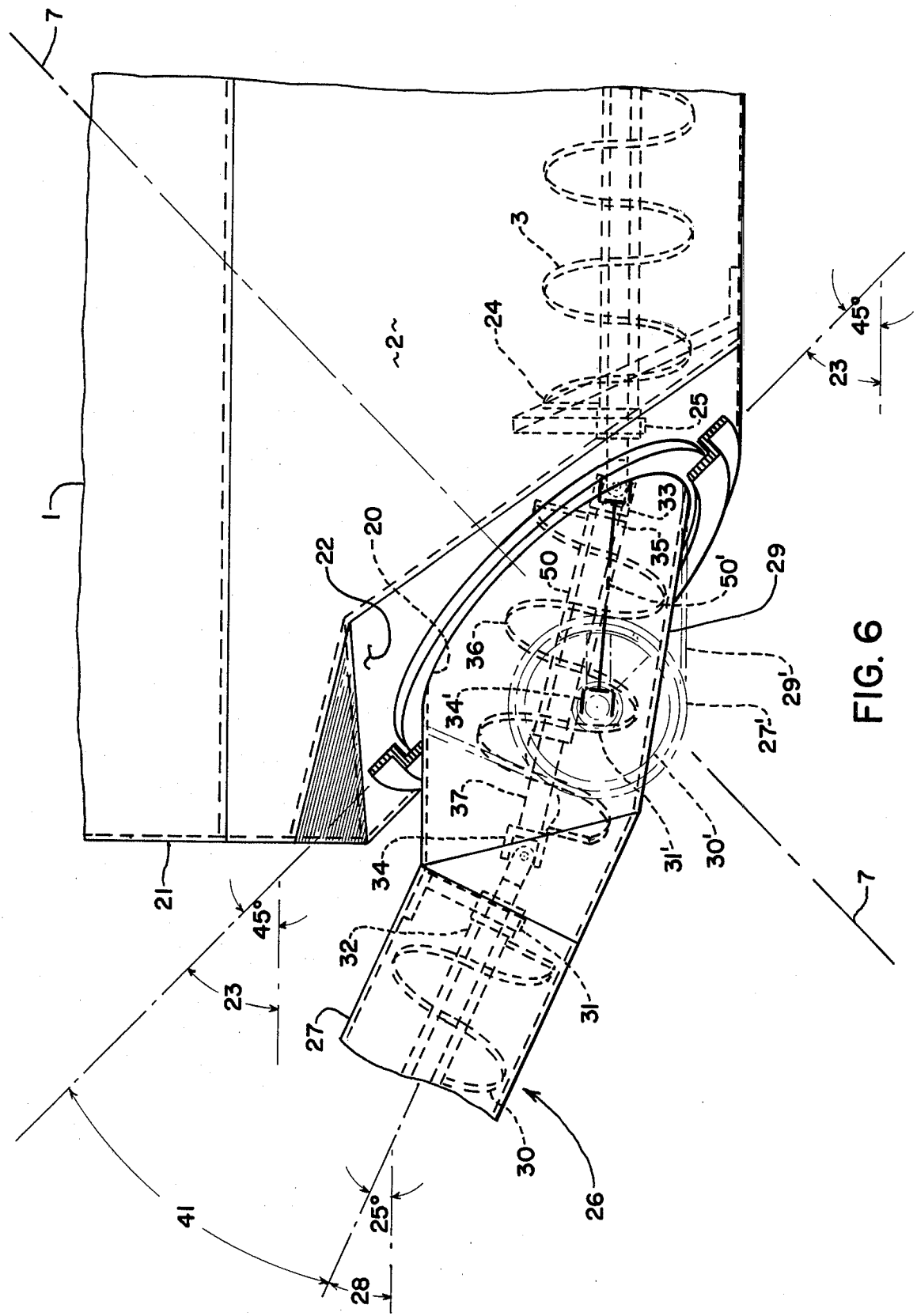
FIG. 6 is a sectional view on the line VI—VI of FIG. 5.

With reference to FIGS. 3, 4, 5 and 6, the combine harvester according to the present invention also comprises a grain tank 1 having a transversely extending trough-shaped lower section 2 containing a transversely extending grain tank unloading auger 3. At the side of the harvester visible in FIG. 3, the grain tank 1 has a circular discharge opening 20 provided in a lower inclined portion 22 of a side wall 21. The wall portion 12 is inclined so as to extend upwardly and outwardly away from the central vertical fore-and-aft plane of the harvester, the portion 22 when viewed longitudinally making an angle 23 of about 45° with respect to the horizontal, as shown in FIGS. 4 and 6. The wall portion 22 is also inclined so as to extend towards the central vertical fore-and-aft plane in a rearward direction, the portion 22 being inclined at about 20° (see FIG. 5) to the central vertical fore-and-aft plane. The grain tank auger has its discharge end 24 at a location spaced inwardly of the wall portion 22 and is supported in bearing means 25 adjacent its discharge end 24.

The harvester comprises an unloading tube 26 having a rectilinear main portion 27 one end of which is secured to an angled end portion 29 which tapers with decreasing cross-sectional area in a direction towards the main portion 27. The larger end of the portion 29 is circular and registers with the opening 20. At its larger end the portion 29 is pivotally mounted on the wall portion 22 about a pivot axis 7 which is perpendicular to the portion 22 and which therefore extends upwardly and forwardly towards the central vertical fore-and-aft plane of the harvester. The diameter of the opening 20 is approximately twice that of the main portion 27. The main portion 27 has an auger 30 supported in bearings at both ends, the bearing at the discharge end not being shown but the bearing at the receiving end 32 being indicated at 31. The receiving end 32 of the auger 30 is spaced from the discharge opening 20.

The grain tank auger 3 and the unloading auger 30 are coupled to each other by two universal joints 33, 34 disposed at respective ends of an intermediate telescoping shaft 50 having shaft portions 35–37 and which extends through the discharge opening 20 and also within the angled portion 29. The intermediate telescoping shaft 50 does not coincide with the pivot axis 7. An auger flight 36 is secured to the portion 35 of the intermediate telescopic shaft 50 in such a manner so that it does not interfere with the telescoping operation thereof. The fact that the diameter of the opening 20 is approximately twice that of the main portion 27 prevents any interference of the intermediate auger flight 36 with any structural component of the grain tank discharge opening 20 and of the angled end portion 29 of the unloading tube in any position of said tube, and more especially in the transport position thereof. When the unloading tube is in the preferred unloading position shown in FIG. 4, the angles 38 and 39 between the grain tank auger 3 and the intermediate auger shaft 50 and between the intermediate auger shaft 50 and the unloading auger 30 are each about 170°. When the unloading tube is pivoted to its transport position (FIG. 3, broken lines 40 in FIG. 4 and phantom outlines in FIGS. 5 and 6) in which the main portion 27 extends substantially parallel to the central vertical fore-and-aft axis of the harvester, each of these angles is 135° so as to define an angle of 90° between the augers 3 and 30. For convenience primed reference numbers are used in FIGS. 5 and 6 to designate elements of the unloading tube in transport position, which elements are shown elsewhere in the drawings under conditions where the transport tube is in its preferred unloading position.

The angle 41 (see FIGS. 4 and 6) between the plane of the discharge opening 20 and the longitudinal axis of the main portion 27 when the unloading tube 26 is in its preferred unloading position substantially corresponds to the angle of inward inclination (i.e. 20°) of the wall portion 22 relative to the central vertical fore-and-aft plane so that the unloading tube 26 lies parallel to said vertical fore-and-aft plane when in the generally horizontal transport position shown in FIG. 3.

A hydraulic cylinder 51 (FIG. 3) is provided between the chassis of the harvester and the unloading tube 26 for pivoting the unloading tube 26 between its inoperative transport position and a chosen unloading position.

Furthermore, simple conventional drive means (not shown) which may take the form of a chain-sprocket transmission, are provided for driving the grain tank auger 3 and hence also the intermediate auger 50 and the unloading auger 30.

OPERATION OF THE PREFERRED EMBODIMENT

In operation, the hydraulic cylinder 51 is actuated to pivot the unloading tube 26 from its transport position (FIG. 3) to a chosen unloading position within a range of unloading positions in all of which the main portion 27 extends generally laterally of the vertical fore-and-aft axis. FIGS. 4 and 6 shows the preferred unloading position in which the tube 26 occupies a vertical plane perpendicular to the central vertical fore-and-aft plane of the harvester, the portion 27 making an angle 28 (see FIGS. 4 and 5) with respect to the horizontal of about 25°. For all usable unloading positions, the discharge end of the unloading tube 26 is positioned above the opening 20 so that a trailer can be positioned underneath the discharge end to receive grain.

The grain tank auger 3 is driven and in turn drives the unloading auger 30 via the universal joints 33 and 34 and the intermediate telescoping shaft 50 so that the grain contained in the grain tank is conveyed smoothly from the grain tank to the trailer without any sharp bend and without any substantial obstructions being met.

Thus, the described harvester has a very simple and hence cheap unloading tube and drive means therefor. Furthermore, maintenance and eventual repair costs are low because of the simple design. The various augers can be driven in all positions of the unloading tube without risk of damage, so that no safety clutch is required as in some known designs.

From the foregoing, a person skilled in the art can fully appreciate the various advantages set forth by the present invention and it will be apparent that various changes may be made in the form, construction and arrangement thereof without departing from the spirit and scope of the invention or sacrificing all of its material advantages, the form hereinbefore described being merely a preferred or exemplary embodiment thereof.

Having thus described the invention, what is claimed is:

1. A combine harvester comprising:
   a grain tank with a discharge opening at one side of the harvester,
   an unloading tube having a main portion and an end portion angled with respect to the main portion, the angled portion being pivotally mounted on the grain tank with the unloading tube in communication with the discharge opening, the pivot axis between the tube and the grain tank being inclined so as to extend upwardly in a direction towards the central vertical fore-and-aft plane of the combine harvester and the unloading tube being pivotally movable throughout a range of unloading positions in all of which the main portion of the tube extends substantially laterally with respect to the central fore-and-aft plane,
   an unloading auger disposed in the main portion of the unloading tube and having a receiving end spaced from the pivotal connection between the tube and the tank,
   a grain tank auger extending within the grain tank and having a discharge end spaced from the pivotal connection between the tube and the tank,
   an intermediate shaft extending between the discharge end of the grain tank auger and the receiving end of the unloading auger, the intermediate shaft being telescopic, and
   a pair of universal joints, respectively disposed at the ends of the intermediate shaft and at opposite sides of the pivotal connection between the tank and the tube, the universal joints respectively connecting the discharge end of the grain tank auger to one end of the intermediate shaft, and the receiving end of the unloading auger to the other end of the intermediate shaft.

2. The combine harvester according to claim 1 wherein the pivot axis between the grain tank and the unloading tube is inclined so as also to extend forwardly in a direction towards the central fore-and-aft plane of the harvester.

3. The combine harvester according to claim 2, wherein the unloading tube is pivotally movable to a transport position in which the main portion of the tube extends substantially parallel to said fore-and-aft plane, and wherein the angle of inclination of the pivot axis and the angle between the main and end portions of the tube are such that the main and end portions of the tube lie in a substantially horizontal plane in the transport position and in a vertical plane, perpendicular to said fore-and-aft plane, in a preferred one of the unloading positions.

4. The combine harvester according to claim 3, wherein in the preferred unloading position the main portion of the tube is inclined at an angle of substantially 20° to the horizontal.

5. The combine harvester according to claim 1 wherein the pivot axis is inclined to the horizontal at an angle of substantially 45° when the harvester is viewed in the longitudinal direction.

6. The combine harvester according to claim 1 wherein the discharge opening is generally circular in shape and has a diameter of substantially twice the diameter of the main portion of the tube, the end portion of the tube tapering with decreasing cross-sectional area towards the main portion of the tube.

7. The combine harvester according to claim 1 wherein the unloading tube lies in a vertical plane perpendicular to said fore-and-aft plane when in a preferred one of the unloading positions, and wherein when the unloading tube is in this preferred unloading position, the angle between the grain tank auger and the intermediate shaft and between the intermediate shaft and the unloading auger is substantially 170°.

8. The combine harvester according to claim 6 wherein the intermediate shaft supports auger means, the diameter thereof being substantially half the diameter of the discharge opening.

9. The combine harvester according to claim 2 wherein the pivot axis between the grain tank and the unloading tube is inclined to the transverse direction of the harvester at an angle of substantially 20° when the harvester is seen in a top view.

10. A combine harvester comprising
    a graintank,
    a grain tank wall section at one side of the combine harvester having a grain tank discharge opening adjacent the bottom thereof, the grain tank wall section with the discharge opening therein being inclined under a first angle with a horizontal plane so as to extend upwardly in an outward direction, and said wall section also being inclined under a second angle with a vertical fore-and-aft plane so as to extend inwardly of the harvester in a rearward direction the arrangement being such that the discharge opening faces downwardly and outwardly in a rearward direction, an unloading tube pivotally mounted on the grain tank and in communication with the discharge opening, the pivot axis between the unloading tube and the grain tank coinciding with the axis of the discharge opening, the unloading tube being pivotally movable throughout a range of unloading positions in all of which the tube extends substantially laterally with respect to the fore-and-aft direction of the harvester, an unloading auger disposed in the unloading tube and having a receiving end spaced from the pivotal connection between the tube and the tank, a grain tank auger extending within the grain tank and having a discharge end spaced from the pivotal connection between the tube and the tank, an intermediate shaft extending between the discharge end of the grain tank auger and the receiving end of the unloading auger, the intermediate shaft being telescopic, and a pair of universal joints, respectively disposed at the ends of the intermediate shaft and at opposite sides of the pivotal connection between the tank and the tube, the universal joints respectively connecting the discharge end of the grain tank auger to one end of the intermediate shaft, and the receiving end of the unloading auger to the other end of the intermediate shaft.

11. The combine harvester according to claim 10 wherein the unloading tube is positioned entirely above the lowermost edge of the discharge opening when positioned in any of its unloading positions.

12. The combine harvester according to claim 11 wherein the unloading tube lies in a vertical plane perpendicular to the fore-and-aft direction of the harvester in a preferred one of the unloading positions, and wherein the unloading tube defines an angle of the range of 20° with the horizontal when in this preferred unloading position.

13. The combine harvester according to claim 11 wherein the unloading tube comprises a main portion and a transition portion angled to the main portion, the angled transition portion being in communication with the discharge opening and defining an angle with the horizontal plane which is smaller than the angle defined by the main portion and said horizontal plane when the unloading tube is in any of its unloading positions.

14. The combine harvester as recited in claim 10 wherein the first angle is substantially double the second angle.

15. The combine harvester as recited in claim 10 wherein the pivot axis between the unloading tube and the grain tank is inclined at an angle to the intermediate shaft when the unloading is in any of its unloading positions.

* * * * *